Figure 1:
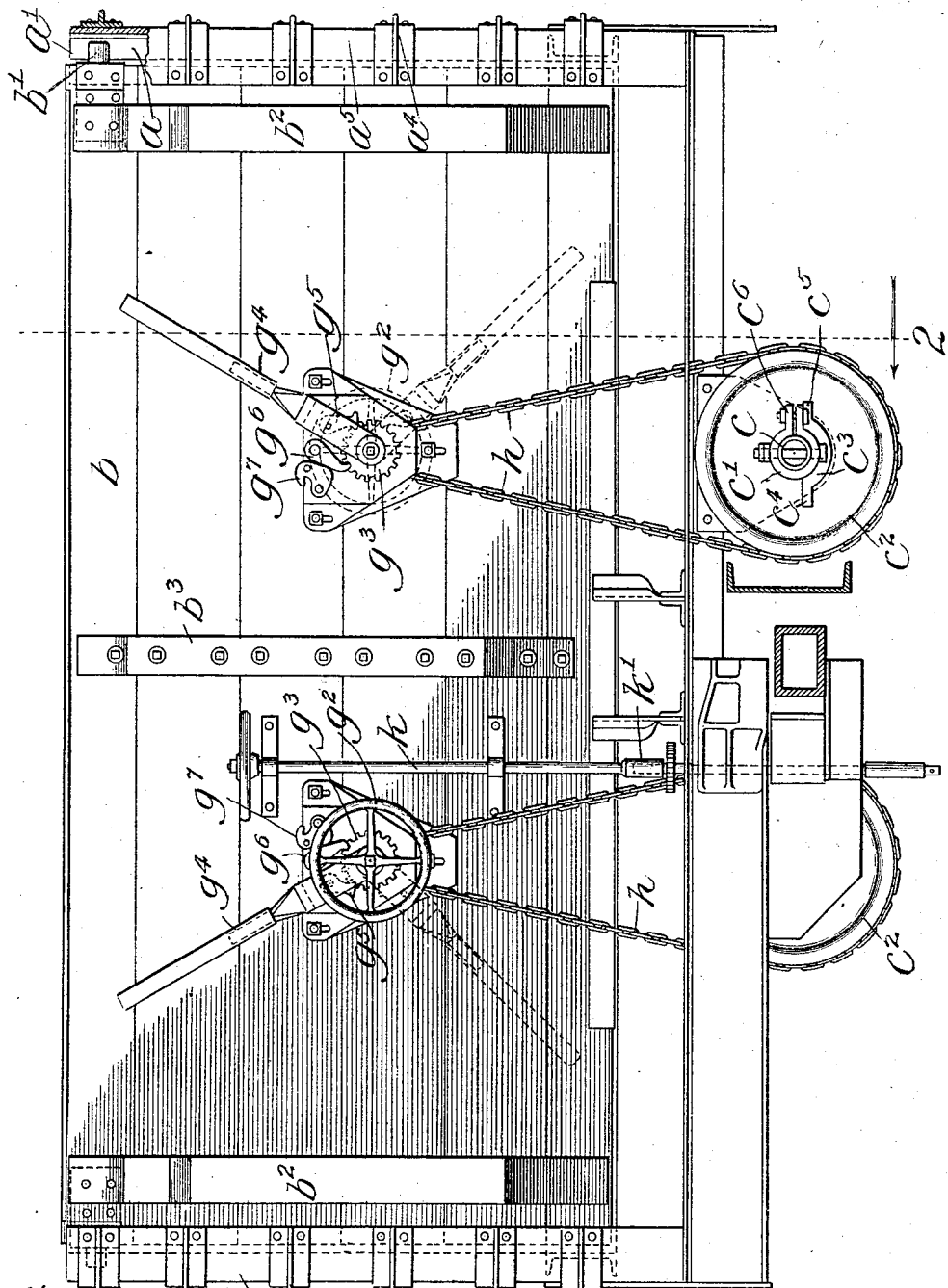

S. OTIS.
DUMP CAR.
APPLICATION FILED NOV. 26, 1906.

968,595.

Patented Aug. 30, 1910.

7 SHEETS—SHEET 1.

Witnesses:
C. C. Gaylord.
John Enders.

Inventor:
Spencer Otis.
By Thomas F. Sheridan
Atty.

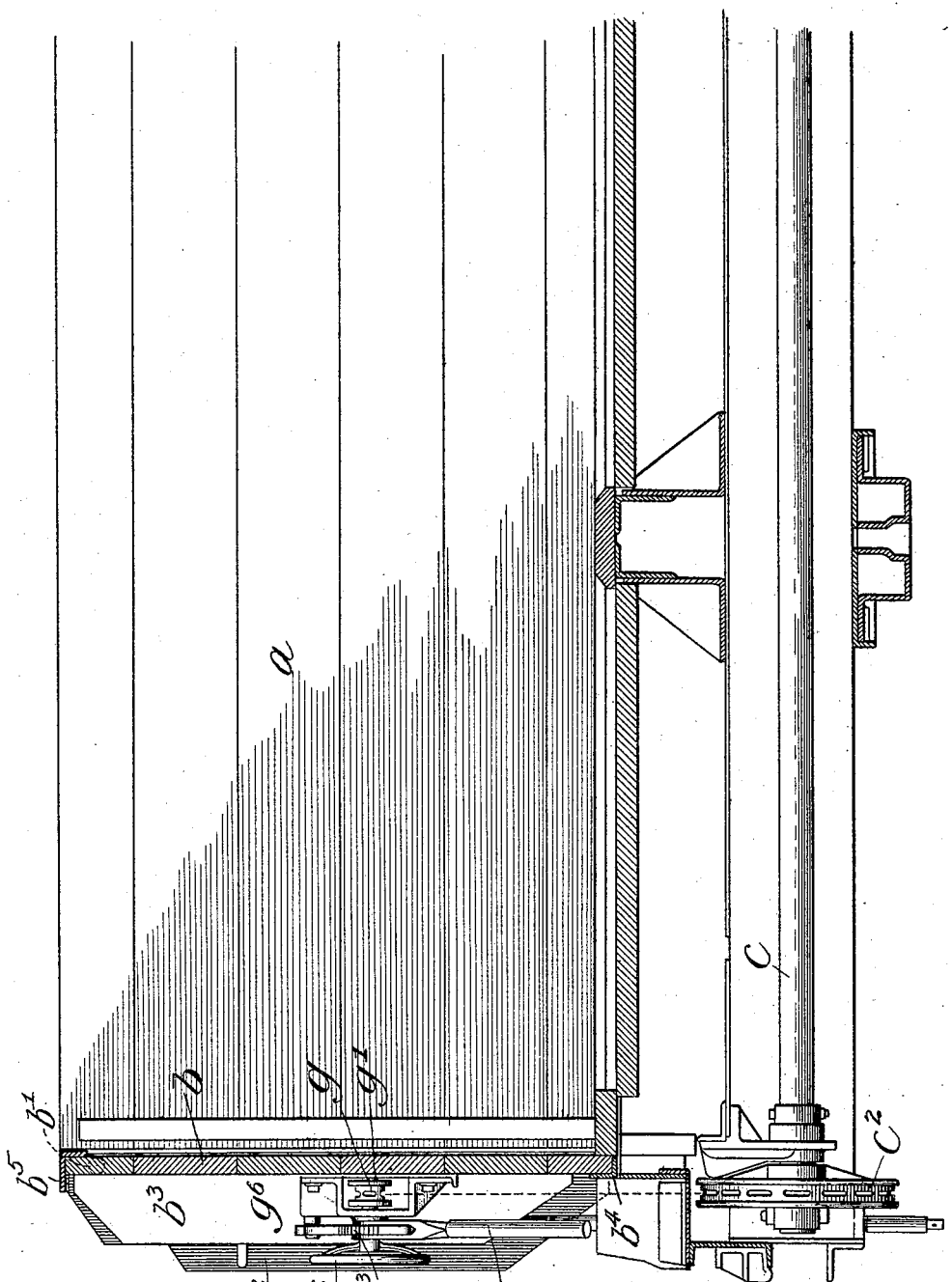

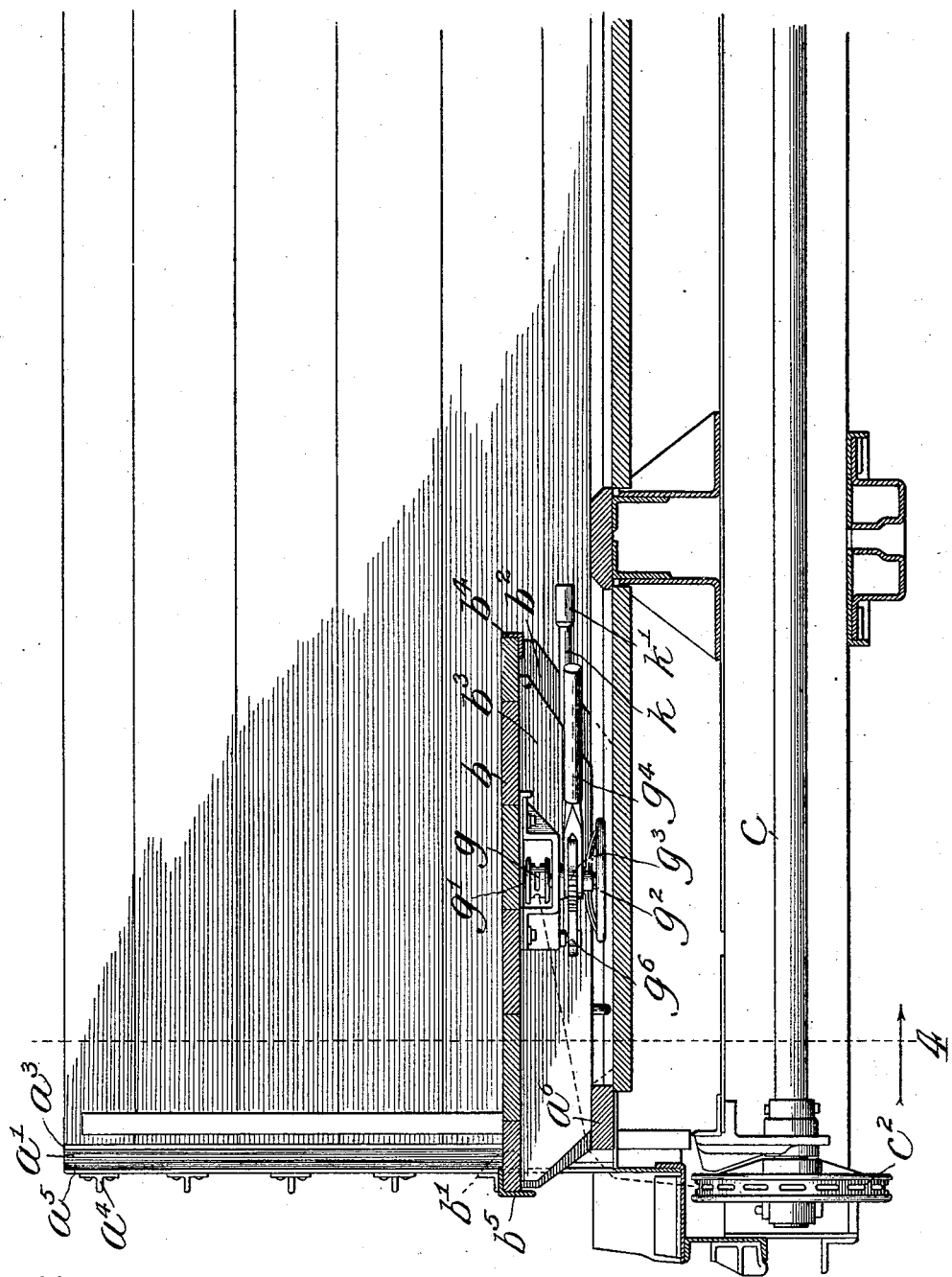

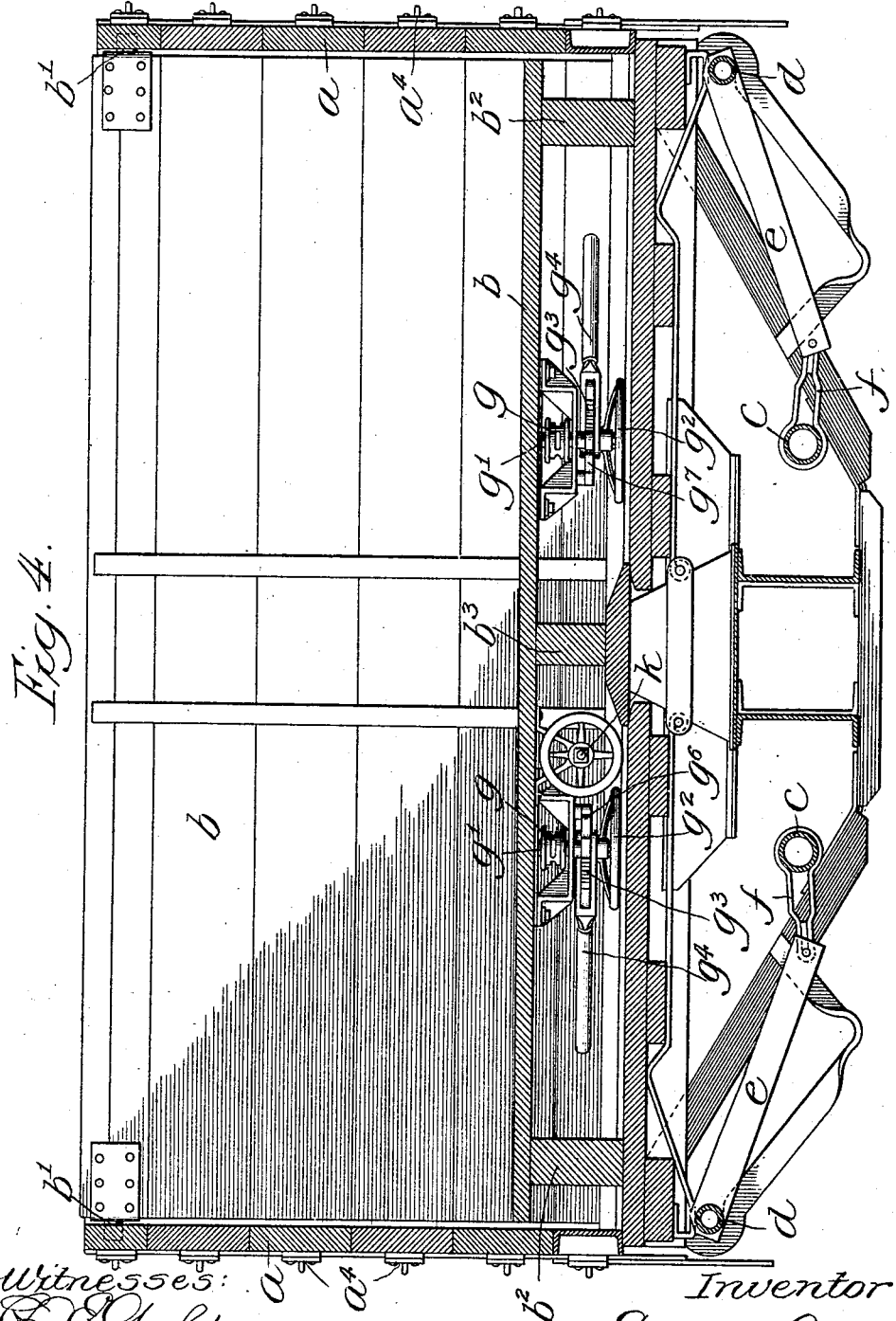

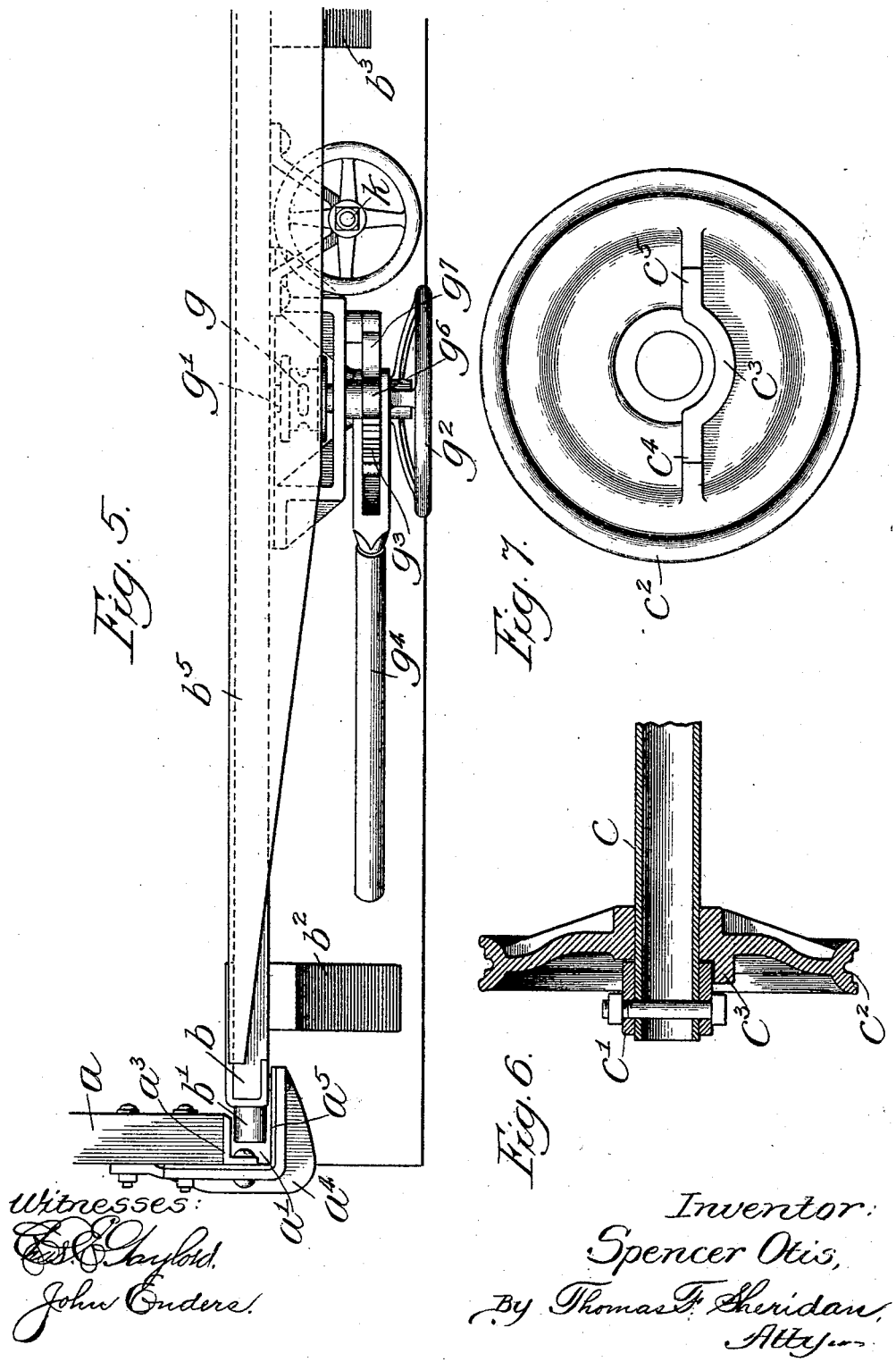

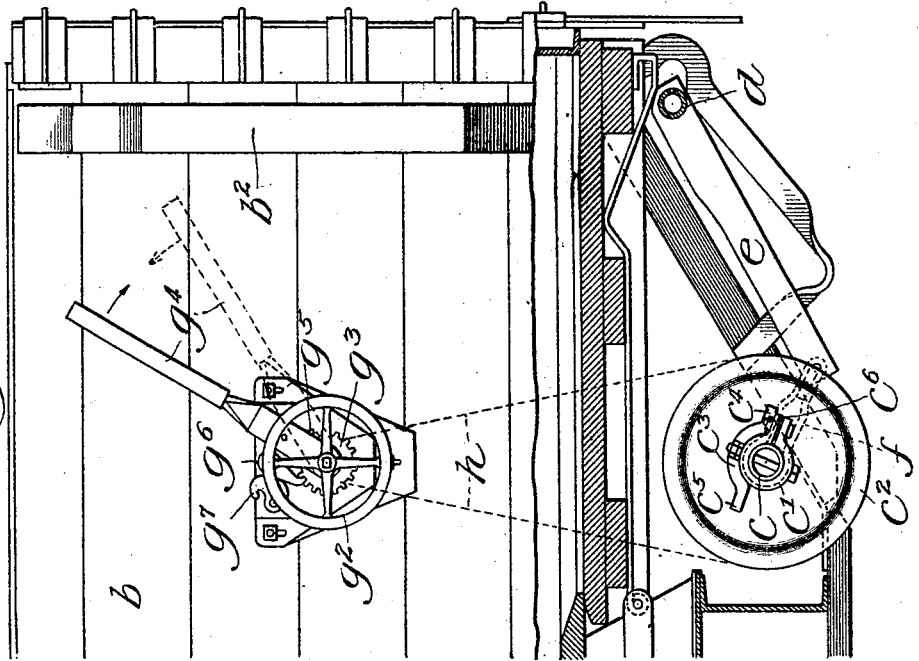
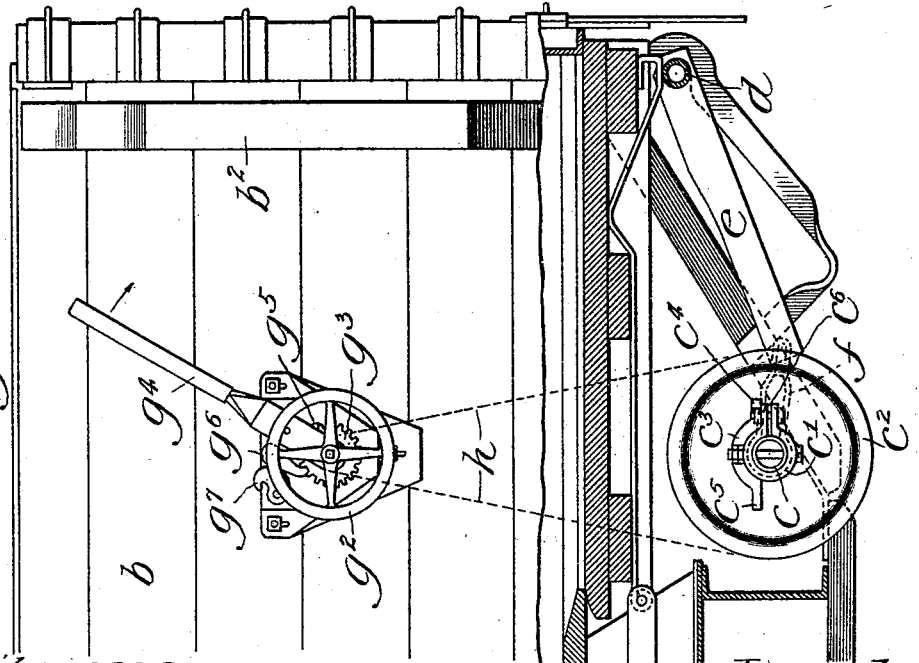

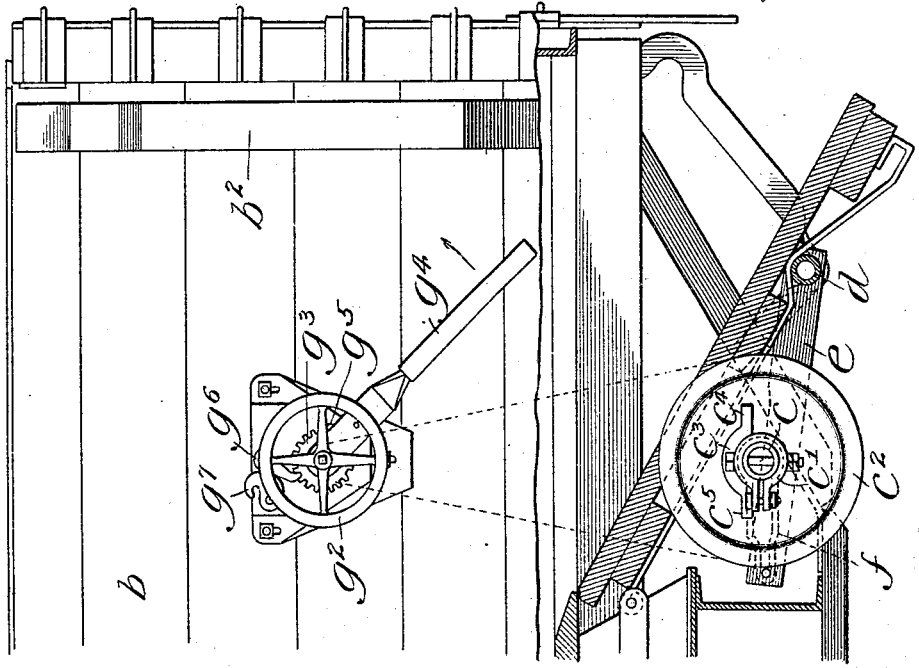
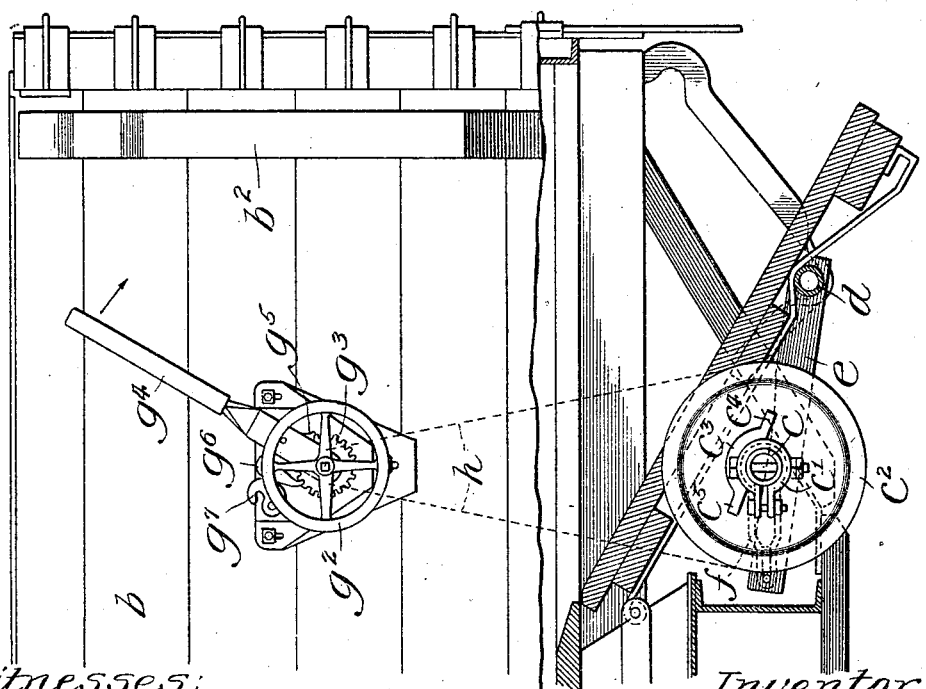

UNITED STATES PATENT OFFICE.

SPENCER OTIS, OF CHICAGO, ILLINOIS, ASSIGNOR TO NATIONAL DUMP CAR COMPANY, OF CHICAGO, ILLINOIS, A CORPORATION OF MAINE.

DUMP-CAR.

968,595.     Specification of Letters Patent.     Patented Aug. 30, 1910.

Application filed November 26, 1906. Serial No. 345,115.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

My invention relates to dump cars; and has for its object to provide an improved car of this type having movable ends and an improved operating mechanism.

With this object in view, my invention consists in the combinations and details hereinafter set forth and claimed.

In the accompanying drawings—Figure 1 is an end elevation of my improved car, partly in section. Fig. 2 is a longitudinal sectional elevation on the line 2 of Fig. 1, showing the operating mechanism. Fig. 3 is a view similar to Fig. 2, showing the end of the car in its lowered position. Fig. 4 is a transverse section on the line 4 of Fig. 3. Fig. 5 is a top plan view of the end of the car. Figs. 6 and 7 are details showing a portion of the operating mechanism. Figs. 8, 9, 10 and 11 are end views showing the positions of the operating mechanism during the opening of the door.

My invention relates particularly to dump cars of the "National" type. As is well known, these cars have a bottom comprising a series of dumping doors hinged adjacent the center sill. These dumping doors are operated and controlled by a reciprocating bar connected by links to an operating shaft extending longitudinally of the car in the underframe thereof.

My invention relates particularly to an improved means for operating these dumping doors, and also to the provision of a movable end portion, said movable end portion carrying a part of the operating means for the dumping doors.

It is desirable some times to carry a load consisting of logs, rails or like articles of considerable length, and it is for this purpose that I provide end portions which may be moved to a horizontal position substantially in the plane of the bottom of the car, so as to permit the carrying of such articles in such manner that they may extend beyond the ends of the car.

In the drawings I show a car having the usual sides $a$ and ends $b$. The sides $a$ at their ends are formed with vertical channels $a'$, these channels being formed between the end of the side which is provided with an angle iron lining $a^3$ and an angle member $a^5$ spaced therefrom and secured to the end of the sides of angle brace members $a^4$. The ends $b$ of the car are provided at their upper corners with projections $b'$ which travel in the channels $a'$ and serve to guide the end of the car in its movements. The ends are also provided with wide cleats $b^2$ adjacent each edge of the end, and at an intermediate point the ends are provided with cleats $b^3$. The upper and lower edges of the ends are covered by angle iron members $b^5$, $b^4$, respectively. It will now be understood that by swinging the lower edge of the end inwardly, the projections $b'$ will be caused to ride downwardly in the channel or guideway $a'$ and the end will rest upon the bottom of the car, being supported thereon by the wide cleats $b^3$. The desired load may then be placed in the car projecting over the ends thereof, if necessary.

In cars of this type it is customary to support a portion of the operating mechanism for the dumping doors upon the ends. In order to do this and at the same time provide for the movement of the end portion, I provide an operating mechanism as follows: $c$ represents the operating shaft for the dumping doors connected to the reciprocating shaft $d$ by links $e$ and $f$—all as is usual and well-known. By turning the operating shaft $c$ in one direction or the other, the reciprocating shaft $d$ is moved to permit the doors to open and to close them. In order to operate the operating shaft, I provide thereon at its end a collar $c'$ having projecting lugs $c^6$ at one side thereof, this collar being rigidly secured to the operating shaft. I also mount at the operating shaft, loosely, an operating wheel $c^2$ provided with a concentric flange portion $c^3$ having ears $c^4$, $c^5$ adapted to engage the projection $c^6$. This operating wheel, which is formed as a chain gear wheel, is connected to a similar chain gear wheel $g$ mounted upon the end board of the car by a chain $h$. The gear wheel $g$ is mounted upon a short shaft $g'$. Also mounted upon this shaft is a hand-wheel $g^2$ fixed to the shaft by means of which the hand-wheel, the shaft and the gear wheel may be turned. Fixed also upon the shaft is the ratchet wheel $g^3$, and the lever $g^4$ is loosely mounted at one end upon this same shaft, the lever $g^4$ being forked, one member of the fork being mounted on each side of the ratchet wheel $e^3$. Between the forked members of the lever is a pawl $g^5$ symmetrically formed at its end, so that it may be reversed to engage the ratchet wheel $g^3$ from either side, a detent pawl and a locking cam $g^7$ serving to hold the ratchet wheel in any position.

In operation, as is well-known, the reciprocating bar $d$, which supports the doors, is first withdrawn for a short distance until it reaches the inclined portion of the track on the under face of the door. At this point the weight upon the door causes the further opening of the door.

It has been customary in cars of this type heretofore, therefore, to provide operating mechanism by means of which the reciprocating shaft may be moved for a short distance after which the door will open, running away from the operating mechanism. Substantially the same movement takes place with the present operating mechanism, and the operation of my improved means may be described as follows: In Fig. 1 the parts are shown in position, say, assumed, when the door is closed. In order to open the door the hand-wheel is rotated to the right—it being assumed that the doors at the right of the figure are being operated. This causes the operating wheel $c^2$, which is loosely mounted upon the operating shaft, to travel around in the same direction until the ear $c^4$ bears against the upper side of the projection $c^6$, as indicated in Fig. 8. At this point the withdrawal of the reciprocating bar begins. There is consequently a heavy load to be overcome. It becomes necessary, therefore, to increase the leverage in operating the shaft, and it is for this purpose that the lever $g^4$ is provided. Leaving the hand-wheel then, the operator causes the further movement of the operating wheel and consequently of the operating shaft by means of the lever $g^4$, which is moved back and forth, as will be readily understood, the pawl $g^5$ engaging the teeth of the ratchet wheel $g^3$ to turn it as the lever is moved downwardly.

When the operating wheel and the projections $c^6$ on the collar $c'$ have assumed the position shown in Fig. 9, the reciprocating bar will have reached the inclined track and the load upon the door will cause the further opening thereof to take place automatically, the operating shaft and the collar thereon running away from the operating mechanism to the position shown in Fig. 10, the door being now open. When it is desired to close the door the operating wheel is moved by turning the hand-wheel to the left, bringing the operating wheel to the position shown in Fig. 11, the ear $c^5$ engaging the upper side of the projections $c^6$. It now becomes necessary to employ the lever again in order to raise the doors. For this purpose, the lever is then thrown down to the position shown in dotted lines in Fig. 1 and the pawl $g^5$ reversed in position, as shown. The upward movement of the lever now causes the turning of the shaft to move the reciprocating bar to its outer position to close the doors.

I claim:

1. A dumping door operating mechanism comprising a reciprocatory door supporting shaft, operating connections therefor, and means for applying power to said operating connections for the purpose of reciprocating said shaft, the said operating connections comprising a lost motion connection.

2. A car of the class described comprising side portions, a bottom portion provided with dumping doors, an operating shaft therefor, an end portion having a sliding pivotal connection with the side portions, and means supported upon the end portion for moving the door operating shaft.

3. A car of the class described comprising side portions, a bottom portion provided with dumping doors, an operating shaft therefor, an end portion having a sliding pivotal connection with the side portions, means attached to the end portion for moving the door operating shaft, and flexible connections between the operating means and the shaft.

4. A dumping door operating mechanism comprising a reciprocating shaft provided with projections, an operating wheel loosely mounted on the shaft and having ears adapted to engage the projections, a hand-wheel, connections between the hand-wheel and operating wheel whereby the ears may be brought into engagement with the projections, and a lever also connected with the operating wheel to apply power thereto.

5. A dumping door operating mechanism, comprising a reciprocating shaft provided with projections, an operating wheel loosely mounted on the shaft having ears adapted to engage the projections, an operating shaft, a hand-wheel mounted on the operating shaft, flexible connections between the operating shaft and the operating wheel, and a lever also mounted on the operating shaft.

6. A car comprising side portions, a bottom portion, dump doors in said bottom portion, and an end portion having sliding pivotal connection with the side portions, door operating mechanism mounted on said end portion, said end portion being provided with cleats adapted to engage the bottom portion.

7. A car of the class described, having a floor comprising hinged dumping doors, a bodily movable shaft supporting and operating the doors, an operating shaft mounted in the underframe of the car for operating the bodily movable shaft, manually operated mechanism mounted on the end of the car, and a flexible connection between the manually operated mechanism and the operating shaft.

8. A dumping door operating mechanism comprising a reciprocatory door supporting shaft, a hand operated means, and a train of operating mechanism extending from said hand operated means to said shaft, the said train of operating mechanism having one abutment on one member between two spaced abutments on a coacting member, whereby a limited independent movement of the one abutment between the other two abutments is permitted.

9. In a gondola car, a floor extending from end to end thereof, side walls, end walls, and means on said end walls near their upper edges pivotally and slidably engaging said side walls.

SPENCER OTIS.

Witnesses:
NORMAN A. STREET,
ANNA L. SAVOIE.